United States Patent
Matsumoto et al.

[11] Patent Number: 5,892,665
[45] Date of Patent: Apr. 6, 1999

[54] OVERCURRENT PROTECTION CIRCUIT

[75] Inventors: Tadahiko Matsumoto, Yokohama; Seiichi Takahashi, Sagamihara; Yoshihiro Matsumoto, Sagamihara; Hitoshi Tsuji, Sagamihara, all of Japan

[73] Assignee: Murata Manufacturing Co., Ltd., Japan

[21] Appl. No.: 111,045

[22] Filed: Jul. 7, 1998

[30] Foreign Application Priority Data

Aug. 25, 1997 [JP] Japan .................................. 9-228218

[51] Int. Cl.$^6$ .......................... H02M 7/122; H02M 7/100
[52] U.S. Cl. ................................. 363/56; 361/18
[58] Field of Search ............................... 363/20, 21, 50, 363/56, 97, 131; 361/18, 87

[56] References Cited

U.S. PATENT DOCUMENTS

| | | | |
|---|---|---|---|
| 4,210,947 | 7/1980 | Koizumi | 361/18 |
| 4,330,816 | 5/1982 | Imazeki et al. | 363/56 |
| 4,736,264 | 4/1988 | Segger | 361/18 |
| 4,937,724 | 6/1990 | Nakajima | 363/56 |
| 5,227,964 | 7/1993 | Furuhata | 363/56 |

*Primary Examiner*—Matthew Nguyen
*Attorney, Agent, or Firm*—Ostrolenk, Faber, Gerb & Soffen, LLP

[57] ABSTRACT

An overcurrent protection circuit provided for a switching power supply has a current detector, voltage superposition device, and circuit for reducing a driving pulse. The current detector detects a circuit current in the switching power supply and converts it to a voltage. The voltage superposition device generates a constant voltage and superposes the voltage onto the detected voltage converted by the current detector. The detected voltage onto which the constant voltage has been superposed is applied between the base and the emitter of a transistor which functions as the circuit for reducing the driving pulse. If an overcurrent flows through the switching power supply, the transistor is turned on and a current flows into the transistor. As a result, a voltage applied to a maximum-duty-cycle setting terminal of a PWM IC provided for the switching power supply and used for pulse-width-modulation control of a switch device is reduced, and the overcurrent is suppressed.

17 Claims, 7 Drawing Sheets

OVERCURRENT PROTECTION CIRCUIT

BACKGROUND OF THE INVENTION

1. Field of the Invention

The present invention relates to an overcurrent protection circuit used for a switching power supply.

2. Description of the Related Art

Switching power supplies used as power supplies for operating circuits of electronic units are classified into isolating-type and non-isolating-type switching power supplies. In the case of an isolating-type switching power supply, the switching power supply comprises an input circuit including a first coil at the primary side of a transformer as an input side and an output circuit including a second coil magnetically coupled with the first coil through a core, at the secondary side as an output side.

The input circuit includes the first coil, a DC power supply, a switch device, and a control circuit.

A current supplied from the DC power supply to the first coil flows intermittently by means of ON/OFF control of the switch device performed by the control circuit. As a result, an AC voltage is generated in the second coil, which is magnetically coupled with the first coil. This AC voltage is extracted as a DC output voltage by a rectifying circuit and a smoothing circuit provided for the output circuit, and supplied to a load.

A pulse-width-modulation IC (hereinafter called a PWM IC) is usually used for the control circuit. The PWM IC is basically formed of an error amplifier, a triangular-wave generator, and a comparator.

An output voltage $V_{out}$ from the output circuit is fed back to the inverted input terminal of the error amplifier and a constant reference voltage is applied to the non-inverted input terminal. The triangular-wave generator outputs, for example, a fundamental triangular wave having a frequency of 20 kHz to 2 MHz. The fundamental triangular wave is input to the inverted input terminal of the comparator and an amplified voltage $V_{amp}$ amplified by the error amplifier is input to the non-inverted input terminal. The comparator compares the fundamental triangular wave with the amplified voltage Vamp and generates a driving pulse for ON-control of the switch device during the period when the fundamental triangular wave is larger than the amplified voltage Vamp. Therefore, as shown in FIGS. 5A to 5C, when the amplified voltage $V_{amp1}$ is large, the pulse width of the driving pulse becomes small, and when the amplified voltage $V_{amp2}$ is small, the pulse width of the driving pulse becomes large. As a result, the ON period of the switch device is varied and pulse-width-modulation control is constantly applied to the output voltage $V_{out}$ from the output circuit.

The frequency of the driving pulse is the same as that of the fundamental triangular wave. In the PWM IC, the ratio of the pulse width of the driving pulse to the period of the driving pulse, namely the duty cycle, is determined. The duty cycle can be made small by reducing a voltage applied to a duty-cycle setting terminal provided for the PWM IC.

In general-purpose PWM ICs, an overcurrent protection circuit is not provided in many cases. Instead, an overcurrent protection circuit is separately provided for a switching power supply. By referring to FIG. 6, a switching power supply provided with an overcurrent protection circuit will be specifically described below with a resonance-reset-forward-type switching power supply being taken as an example.

An input circuit of the switching power supply includes a first coil 1A at the primary side of the transformer 1, described above, a DC power supply 2, a switch device 3, and a PWM IC 4. An overcurrent protection circuit 5 is also connected as shown.

In a switching power supply, MOS FETs (metal oxide semiconductor field effect transistors), IGBTs (insulated gate bipolar transistors), and bipolar transistors are used for the switch device 3, in general. Therefore, in the following description, a case in which a MOS FET is used as the switch device 3 will be taken as an example and described.

One end of the first coil 1A is connected to the positive voltage side of the DC power supply 2, and the other end is connected to the drain D of the MOS FET 3. The source S of the MOS FET 3 is connected to the negative voltage side of the DC power supply 2 through the overcurrent protection circuit 5. The gate G of the MOS FET 3 is connected to a gate drive terminal $T_1$ of the PWM IC 4. A ground terminal $T_2$ of the PWM IC is connected to the negative voltage side of the DC power supply 2.

The overcurrent protection circuit 5 is formed of a current detecting resistor 6, a comparator 7, a comparison-reference power supply 8, and a resistor 9.

One end of the current detecting resistor 6 is connected to the source S of the MOS FET 3 and to the inverted input terminal of the comparator 7. The other end of the current detecting resistor 6 is connected to the negative voltage side of the DC power supply 2. The non-inverted input terminal of the comparator 7 is connected to the positive voltage side of the comparison-reference power supply 8. The negative voltage side of the comparison reference power supply 8 is connected to the negative voltage side of the DC power supply 2. The open collector output of the comparator 7 is connected to the maximum-duty-cycle setting terminal T3 for the PWM IC 4 provided for the PWM IC 4 and also connected to a constant-voltage reference power supply $V_s$ through the resistor 9.

Usually, a capacitor 10 is connected in parallel to both ends of the current detecting resistor 6, and the capacitor 10 bypasses a high-frequency component included in a current detected by the current detecting resistor 6. As a result, malfunction of the overcurrent protection circuit 5 caused by the high-frequency component is suppressed. When the PWM IC 4 is provided with a constant-voltage output terminal $T_s$, the open collector of the comparator 7 may be directly connected to the output terminal $T_s$ through the resistor 9. The comparison-reference power supply 8 may be formed by dividing the constant voltage output from the output terminal $T_s$ with resistors.

The output circuit includes a second coil 1B, an output rectifying diode 11, a flywheel diode 12, a choke coil 13, and a smoothing capacitor 14.

The second coil 1B is magnetically coupled with the first coil 1A through the core 1C. One end of the second coil 1B is connected to the cathode of the output rectifying diode 11. The anode of the output rectifying diode 11 is connected to the anode of the flywheel diode 12, and the cathode of the flywheel diode 12 is connected to the other end of the second coil 1B. The anode of the output rectifying diode 11 is also connected to one end of the choke coil 13, and the other end of the choke coil 13 is connected to the cathode of the flywheel diode 12 through the capacitor 14. The cathode of the flywheel diode 12 is connected to the feedback terminal $T_4$ of the PWM IC 4.

A load 15 is connected to both ends of the smoothing capacitor 14.

The operation of the switching power supply will be described below.

Between both ends of the current detecting resistor 6, a voltage proportional to a source current $I_s$ flowing through the source S of the FET 3 is generated. The comparator 7 compares the voltage $V_6$ across the current detecting resistor 6 with the reference voltage $V_8$ of the comparison-reference power supply 8.

When the source current $I_s$ does not exceed the current specified in advance, the voltage $V_6$ is smaller than the reference voltage $V_8$, and the comparator 7 is kept at an off state. Therefore, a current does not flow from the reference power supply $V_s$ to the comparator 7 through the resistor 9 and the open collector of the comparator 7. Consequently, the voltage at the duty-cycle setting terminal $T_3$ of the PWM IC 4 is maintained at the same voltage as that of the reference power supply $V_s$, and the duty cycle of the PWM IC 4 is held at a constant.

When the source current $I_s$ becomes greater than the current specified in advance, in other words, when an overcurrent flows through the source S of the FET 3, the voltage $V_6$ becomes larger than the reference voltage $V_8$ and the comparator 7 is turned on. As a result, a current flows from the reference power supply Vs to the comparator 7 through the resistor 9 and the open collector of the comparator 7. Therefore, the voltage at the duty-cycle setting terminal $T_3$ of the PWM IC 4 becomes lower than that of the reference power supply Vs by a voltage drop at the resistor 9. Consequently, the duty cycle of the PWM IC 4 is set to a small value, and the pulse width of the driving pulse for ON-control of the MOSFET becomes small. As a result, the overcurrent flowing through the source S of the MOSFET 3 is suppressed.

On-control is applied to the FET 3 by the driving pulse output from the gate drive terminal T1 of the PWM IC 4, and a current flows intermittently through the first coil 1A. As a result, an AC voltage is generated in the second coil 1B. This AC voltage is half-wave rectified by the output rectifying diode 11 and the flywheel diode 12, then smoothed by the choke coil 13 and the smoothing capacitor 14, and supplied to the load 15 as a DC output voltage $V_{out}$.

In recent years, to make a switching power supply compact, however, a switch device operating at a relatively high switching frequency ranging from several hundreds to several MHz is used in some cases.

Therefore, in a case in which an overcurrent protection circuit using a comparator is employed, when the comparator response time is long, even if an overcurrent flows through the switching power supply, the comparator cannot immediately follow. As shown in FIG. 7A, the curve indicating the relationship between the output current and the output voltage decreases gradually. Therefore, the maximum value of the output current flowing through the switching power supply becomes large, and heat generated at electronic components constituting the input circuit and the output circuit becomes high.

On the other hand, when a comparator having a short response time is used so as to follow the operation of the switch device, the curve indicating the relationship between the output current and the output voltage, obtained when an overcurrent flows through the switching power supply, decreases almost immediately. Therefore, a response to an overcurrent becomes extremely satisfactory. However, a short-response-time comparator is generally expensive and it has a large power consumption. Therefore, the switching power supply becomes expensive and energy is wasted.

SUMMARY OF THE INVENTION

Accordingly, an object of the present invention is to provide an overcurrent protection circuit for solving the foregoing problems.

In a first aspect, the present invention provides an overcurrent protection circuit for a switching power supply including a switch device; a PWM IC for generating a driving pulse for pulse-width-modulation control of the switch device, the PWM IC provided with a setting terminal at which the maximum duty cycle of the driving pulse is set to a small value by reducing an applied voltage; and an output rectifying diode for rectifying an AC voltage generated by ON-OFF control of the switch device. The overcurrent protection circuit includes: current detecting means for detecting a circuit current flowing through at least one of the switch device and the output rectifying diode and for producing a detected voltage; voltage superposition means connected to a first voltage source at one end, for superposing a constant voltage onto the detected voltage detected by the current detecting means; and means for narrowing the width of the driving pulse for the switch device. The means for narrowing the driving pulse width includes a transistor which is ON-controlled by the voltage obtained by superposing the constant voltage onto the detected voltage detected by the current detecting means when an overcurrent flows, and a resistor connected between the collector of the transistor and a second voltage source, whereby a voltage applied to the setting terminal of the PWM IC is reduced due to a voltage drop at the resistor when the transistor is turned on.

The current detecting means detects a circuit current flowing through the switch device or the output rectifying diode, and converts it to a voltage. The voltage superposition means generates a constant voltage.

The voltage generated by the voltage superposition means is superposed onto the voltage converted by the current detecting means and is applied between the base and the emitter of the transistor provided for the means for narrowing the driving pulse width.

If an overcurrent flows through the switch device or the output rectifying diode, the voltage converted by the current detecting means becomes large and the transistor is turned on. Therefore, in the means for narrowing the driving pulse width, a current flows from the second power supply to the transistor through the resistor and a voltage drop is generated at the resistor. As a result, the voltage applied to the duty-cycle setting terminal of the PWM IC becomes low and the width of the driving pulse for the switch device is narrowed.

In a second aspect, the voltage superposition means includes a diode, and the forward-direction voltage drop of the diode is superposed as the constant voltage onto the detected voltage detected by the current detecting means in the overcurrent protection circuit described in the first aspect. According to this aspect, a current flowing through the diode generates the forward-direction voltage drop. This voltage is superposed as the constant voltage onto the detected voltage detected by the current detecting means.

In a third aspect, the current detecting means described in the first aspect is formed of a current detecting resistor. According to this aspect, a circuit current flowing through the switch device or the output rectifying diode generates a detection voltage across the current detecting resistor.

In a fourth aspect, the current detecting means described in the first aspect is formed of a current transformer and a resistor connected to both ends of the secondary coil of the current transformer. According to this aspect, a circuit current flowing through the switch device or the output rectifying diode generates a voltage in the primary coil of the current transformer. A voltage proportional to the voltage generated in the primary coil is induced in the secondary coil of the current transformer, and the voltage across the resistor is equal to the induced voltage.

In a fifth aspect, the first voltage source described in one of the first to fourth aspects, connected to one end of the voltage superposition means, is a DC power supply. According to this aspect, a current always flows through the voltage superposition means connected to the DC power supply and generates a constant voltage.

In a sixth aspect, the first voltage source described in one of the first to fourth aspects, connected to one end of the voltage superposition means, is a pulse power supply synchronized with the ON signal for the switch device. According to this aspect, a current flows through the voltage superposition means connected to the pulse power supply in synchronization with the ON signal for the switch device. A constant voltage is generated only during the ON period of the switch device.

For the purpose of illustrating the invention, there are shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

DETAILED DESCRIPTION OF EMBODIMENTS OF THE INVENTION

Hereinafter, the preferred embodiments of the present invention are explained in detail with reference to the drawings.

Figure 6:
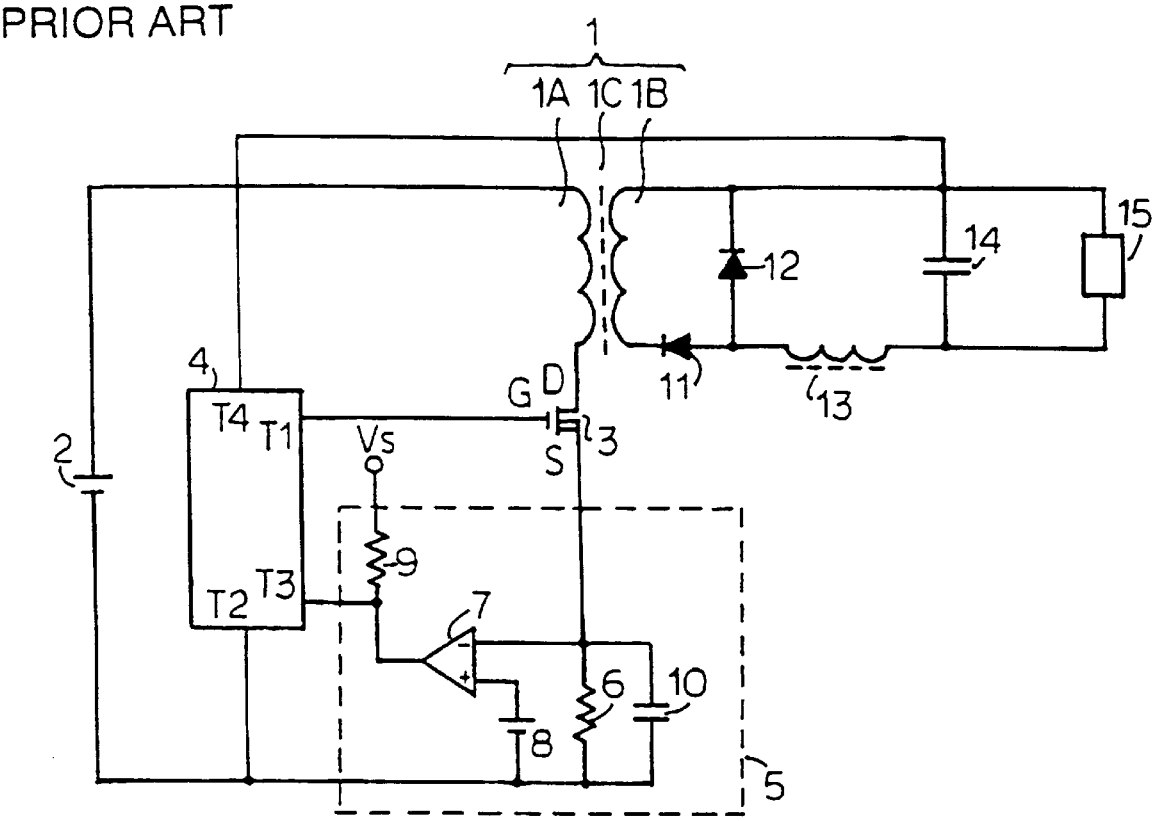
FIG. 6 is a circuit diagram of a switching power supply provided with a conventional overcurrent protection circuit.
Figure 7A:
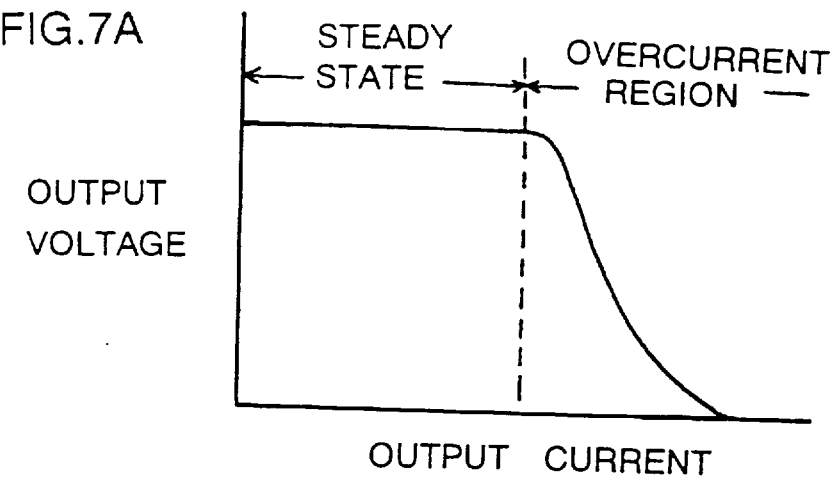
FIG. 7A and 7B respectively shows the relationships between the output voltage and the output current of a switching power supply provided with an overcurrent protection in the case where the overcurrent protection circuit has a slow response and in the case where the overcurrent protection circuit has a fast response.
Figure 7B:
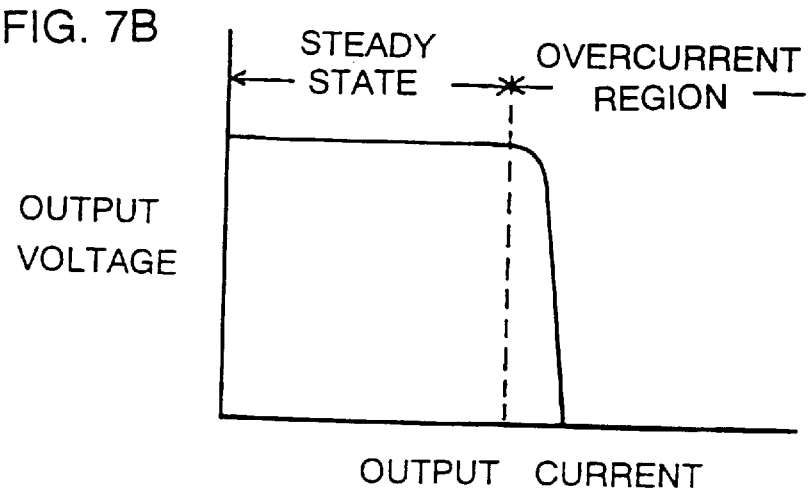

An overcurrent protection circuit provided, for example, for an isolating-type, resonance-reset-forward-type switching power supply will be described below by referring to FIG. 1. The same reference numerals are used for to the same elements as those in the conventional overcurrent protection circuit shown in FIG. 6.

An overcurrent protection circuit 16 comprises current detecting means 17, voltage superposition means 18, and means 19 for narrowing a driving pulse width.

The current detecting means 17 includes a current detecting resistor 6. One end of the current detecting resistor 6 is connected to the source S of a MOSFET 3, and the other end is connected to the negative voltage side of a DC power supply 2.

The voltage superposition means 18 includes a resistor 20 and a diode 21. The cathode of the diode 21 is connected to the source S of the MOSFET 3 and the anode is connected through the resistor 20 to a first reference power supply Vs1 which serves as a DC power supply.

The means 19 for narrowing the driving pulse width includes an npn transistor 22 and a resistor 23. The base B of the transistor 22 is connected to the anode of the diode 21 and the emitter E is connected to the negative voltage side of the DC power supply 2. The collector C thereof is connected to a duty-cycle setting terminal T3 for a PWM IC 4 and also connected to a second reference power supply Vs2 which serves as a DC power supply through a resistor 23.

Usually, a capacitor 10 is connected in parallel to both ends of the current detecting resistor 6. The capacitor 10 bypasses a high-frequency component included in a current flowing through the current detecting resistor 6. As a result, malfunction of the overcurrent protection circuit 16 caused by the high-frequency component is suppressed. When the PWM IC4 is provided with constant-voltage output terminals Ts1 and Ts2, the anode of the diode 21 may be connected to the output terminal Ts1 through the resistor 20. The collector C of the transistor 22 may be connected to the output terminal $T_{s2}$ through the resistor 23.

The operation of the overcurrent protection circuit 16 will be described below.

Between both ends of the current detecting resistor 6, a voltage proportional to a source current $I_s$ flowing through the source S of the FET 3 is generated.

From the first reference power supply $V_{s1}$, a current always flows through the resistor 20, the diode 21, and the current detecting resistor 6. As a result, between the anode and the cathode of the diode 21, a forward-direction voltage drop $V_{21}$ of the diode 21 is generated. On the other hand, the resistance of the resistor 20 is set to a value much larger than that of the current detecting resistor 6. Therefore, the voltage generated in the current detecting resistor 6 is very small and it can be ignored.

Consequently, between the base B and the emitter E of the transistor 22, the voltage obtained by superposing the forward-direction voltage drop $V_{21}$ of the diode 21 on the voltage V6 detected by the current detecting resistor 6 is applied.

When the transistor 22 is made from silicon, the ON voltage between the base B and the emitter E required for turning on the transistor 22 is about 0.6 V. When the switching power supply correctly operates and the source current flowing through the source S of the MOSFET is normal, the voltage obtained by superposing the forward-direction voltage drop $V_{21}$ on the voltage V6 is about 0.6 V or less, and the transistor 22 is maintained at an off state. Therefore, a current does not flow from the second reference power supply $V_{s2}$ through the resistor 23 to the transistor 22. As a result, the voltage at the duty-cycle setting terminal $T_3$ of the PWM IC 4 is maintained at the same voltage as the second reference power supply Vs2 and the duty cycle of the PWM IC 4 is maintained at a constant.

When an overcurrent flows through the source S of the MOSFET 3 and the voltage obtained by superposing the forward-direction voltage drop V21 on the voltage $V_6$ is about 0.6 V or more, the transistor 22 is turned on. As a result, a current flows from the second reference power supply Vs2 through the resistor 23 and the transistor 22, and the voltage at the duty-cycle setting terminal $T_3$ of the PWM IC 4 becomes lower than the constant voltage of the second reference power supply $V_{s2}$ by the voltage drop across the resistor 23. Therefore, the pulse width of the driving pulse for applying ON-control to the MOSFET 3 decreases, and the duty cycle of the PWM IC 4 decreases. The overcurrent flowing through the source S of the MOSFET 3 is suppressed.

Between the base B and the emitter E of the transistor 22, the voltage obtained by superposing the forward-direction voltage drop $V_{21}$ on the voltage $V_6$ is applied, and the transistor 22 is on/off controlled. Therefore, the peak voltage generated between both ends of the current detecting resistor 6 may be smaller than the conventional value, about 0.6 V. Consequently, the resistance of the current detecting resistor 6 can be set to a small value. As a result, a continuity loss generated at the current detecting resistor 6, caused by the current flowing through the source S of the MOSFET 3, becomes small. On the other hand, the current always flowing from the first reference power supply Vs1 through the resistor 20, the diode 21, and the current detecting resistor 6 is lower than the current flowing through the source S of the MOSFET 3. Therefore, the continuity loss generated at the resistor 20 is small, and the total continuity loss is reduced in the switching power supply as a whole.

The ON voltage applied between the base B and the emitter E in order to turn on the transistor 22 varies according to the ambient temperature of the transistor 22. As the ambient temperature becomes higher than room temperature, the ON voltage becomes lower. The current value of an overcurrent detected by the current detecting resistor 6 is determined by the ON-voltage/resistance of the current detecting resistor 6. Therefore, when the ambient temperature of the transistor 22 becomes higher than room temperature, the current value of an overcurrent detected by the current detecting resistor 6 is reduced.

In the same way as for the ON-voltage of the transistor 22, however, the forward-direction voltage drop $V_{21}$ of the diode 21 also changes according to the ambient temperature. Therefore, when the diode 21 is mounted in the vicinity of the transistor 22, both devices operate at the same ambient temperature. When the ON-voltage of the transistor 22 becomes low, the forward-direction voltage drop $V_{21}$ of the diode 21, which is superposed on the detected voltage $V_6$, also becomes low at the same time. Therefore, the voltage drifts caused by the temperature of the transistor 22 and the diode 21 cancel each other, and thereby the drift caused by the temperature in the overcurrent protection circuit 16 becomes small.

Consequently, even if the ambient temperature becomes higher than room temperature, in order to operate the overcurrent protection circuit 16 at a certain current or more, for example, at an overcurrent set to about 110% of the maximum rated current of the switching power supply, it is not necessary to set the current value of an overcurrent to be detected by the current detecting resistor 6 at room temperature to a high value. Therefore, heat generated in electronic components constituting the input circuit and the output circuit can be suppressed to a low level.

To prevent malfunction at a steady state, the forward-direction voltage drop $V_{21}$ of the diode 21 is set to be lower than the ON-voltage of the transistor 22. Therefore, as the diode 21, which is used for the overcurrent protection circuit 16, a Schottky barrier diode, which has a low forward-direction voltage drop, is suitable.

Figure 2:
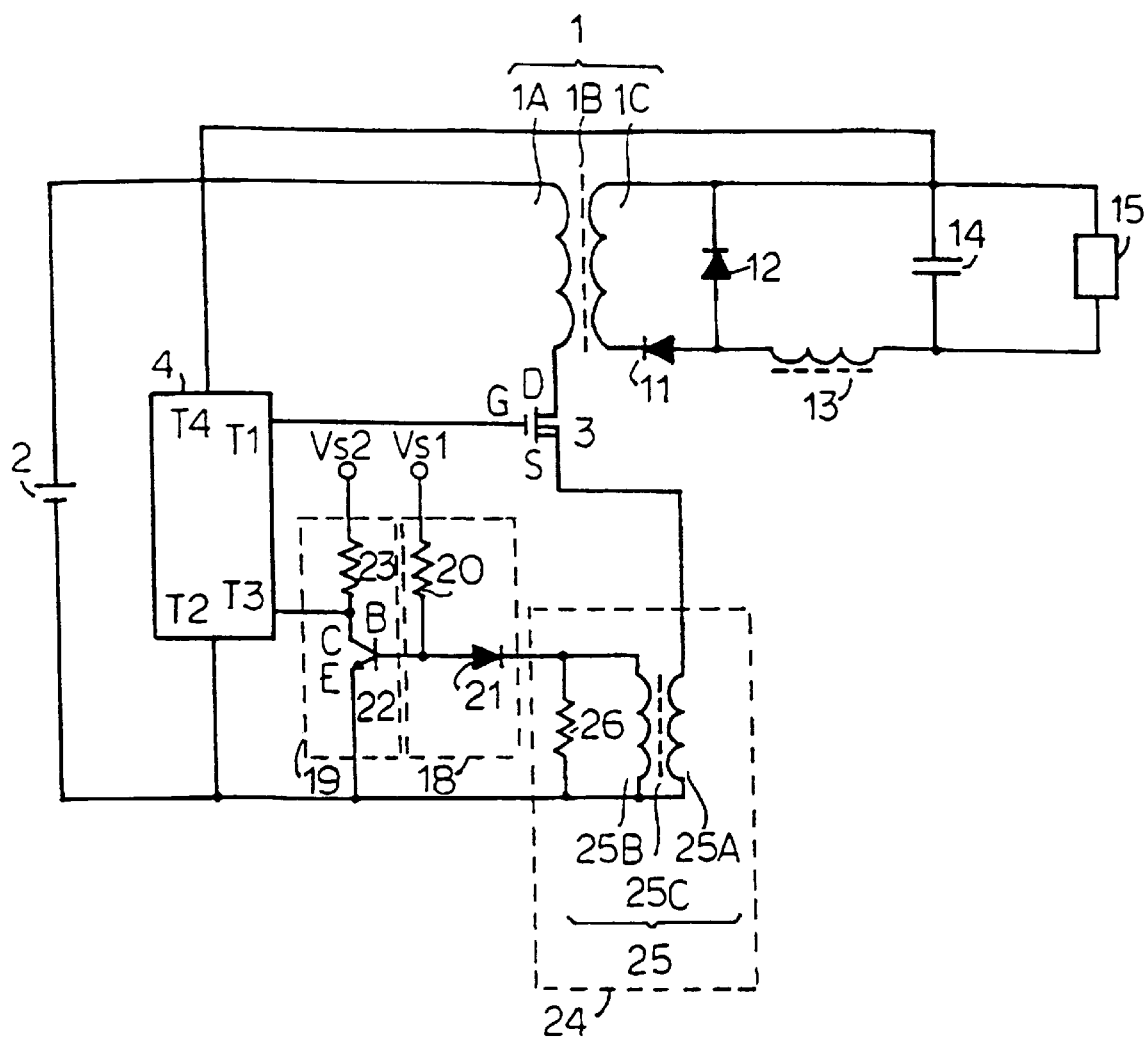
FIG. 2 is a circuit diagram of a switching power supply in which an overcurrent detecting means in the overcurrent protection circuit according to the present invention is replaced with another overcurrent detecting means.

The overcurrent detecting means 17 is not limited to that formed by the current detecting resistor 6. By referring to FIG. 2, another overcurrent detecting means 24 will be described below.

The overcurrent detecting means 24 is formed by a current transformer 25 and a resistor 26. One end of a primary coil 25A of the current transformer 25 is connected to the source S of the MOSFET 3, and the other end is connected to the negative voltage side of the DC power supply 2. One end of a secondary coil 25B magnetically coupled with the primary coil 25A is connected to the cathode of the diode 21, which constitutes the voltage superposition means 18, and the other end is connected to the negative voltage side of the DC power supply 2. The resistor 26 is connected in parallel to both ends of the secondary coil 25B.

The source current Is, which passes through the source S of the MOSFET 3, generates a voltage at the primary coil 25A. At the secondary coil 25B, which is magnetically coupled with the primary coil 25A through a core 25C, a voltage proportional to the voltage generated at the primary coil 25A is induced. As a result, the voltage generated across the resistor 26 is equal to the voltage induced at the secondary coil 25B.

A current always flows from the first reference power supply $V_{s1}$ through the resistor 20, the diode 21, and the resistor 26, and the forward-direction voltage drop $V_{21}$ of the diode 21 is generated between the anode and the cathode of the diode 21. Therefore, between the base B and the emitter E of the transistor 22, the voltage obtained by superposing the forward-direction voltage drop $V_{21}$ of the diode 21 onto the voltage across the resistor 26 is applied. If an overcurrent flows through the switching power supply, the voltage obtained by superposing the forward-direction voltage drop $V_{21}$ onto the voltage across the resistor 26 becomes about 0.6 V or more, and the transistor 22 is ON-controlled. As a result, the duty cycle of the PWM IC 4 decreases and the overcurrent flowing through the source S of the MOSFET 3 is suppressed.

Figure 1:
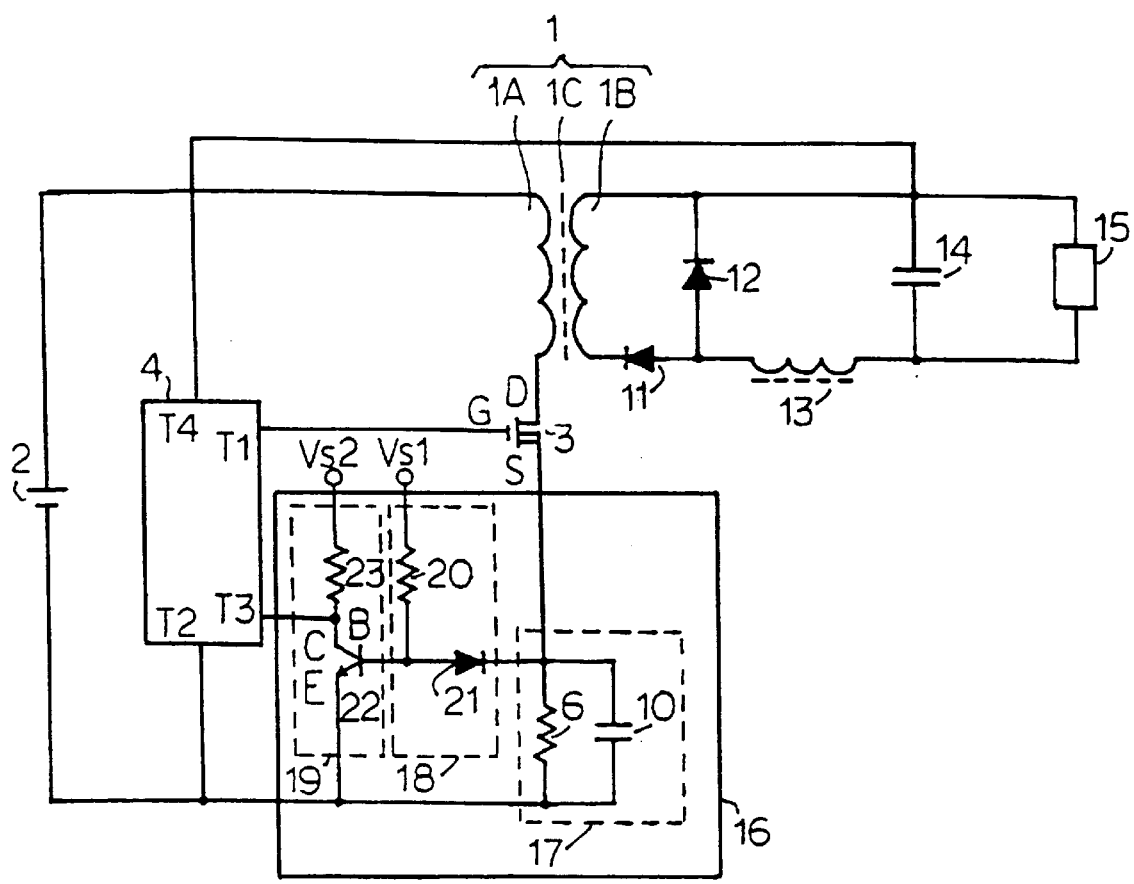
FIG. 1 is a circuit diagram of a switching power supply provided with an overcurrent protection circuit according to the present invention.

In the overcurrent protection circuit 16 shown in FIG. 1, since a current always flows from the first reference power supply $V_{s1}$ through the resistor 20, the diode 21, and the current detecting resistor 6, slight continuity losses are produced in the resistor 20, the diode 21, and the current detecting resistor 6. Therefore, to reduce the continuity losses, a case in which a pulse power supply is used instead of the first reference power supply Vs1 will be described below.

Figure 3:
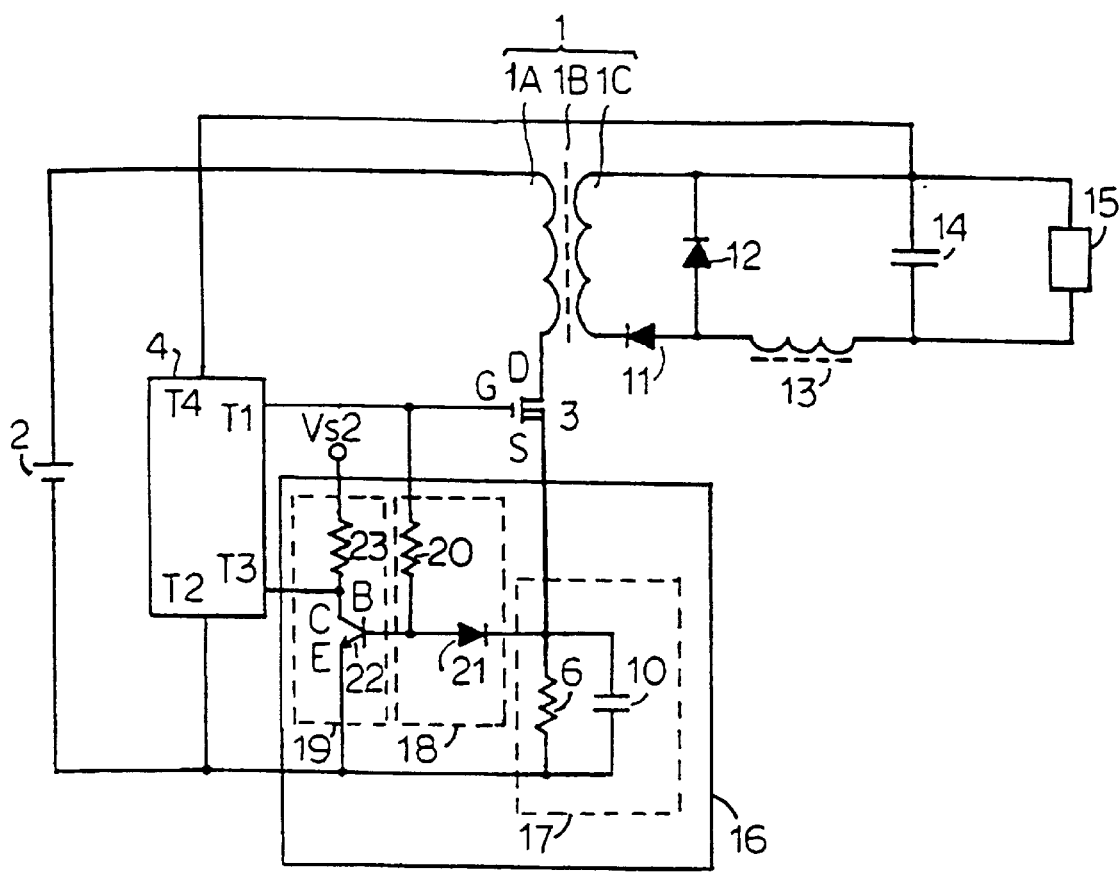
FIG. 3 is a circuit diagram of a switching power supply in which a pulse power supply is substituted for a DC power supply used to apply a voltage to a voltage superposition means of the overcurrent protection circuit according to the present invention.

Specifically, as shown in FIG. 3, the anode of the diode 21 is connected to the gate of the MOSFET 3 through the resistor 20. Therefore, only during the ON period of the MOSFET 3, a current flows through the resistor 20, the diode 21, and the current detecting resistor 6, and the forward-direction voltage drop $V_{21}$ is generated between the anode and the cathode of the diode 21. Consequently, since a current does not flow into the route formed by the resistor 20, the diode 21, and the current detecting resistor 6 during the OFF period of the MOSFET 3, the continuity losses are reduced.

The same advantage is obtained in a case in which the current transformer 25 is used as the current detecting means 24.

Figure 4:
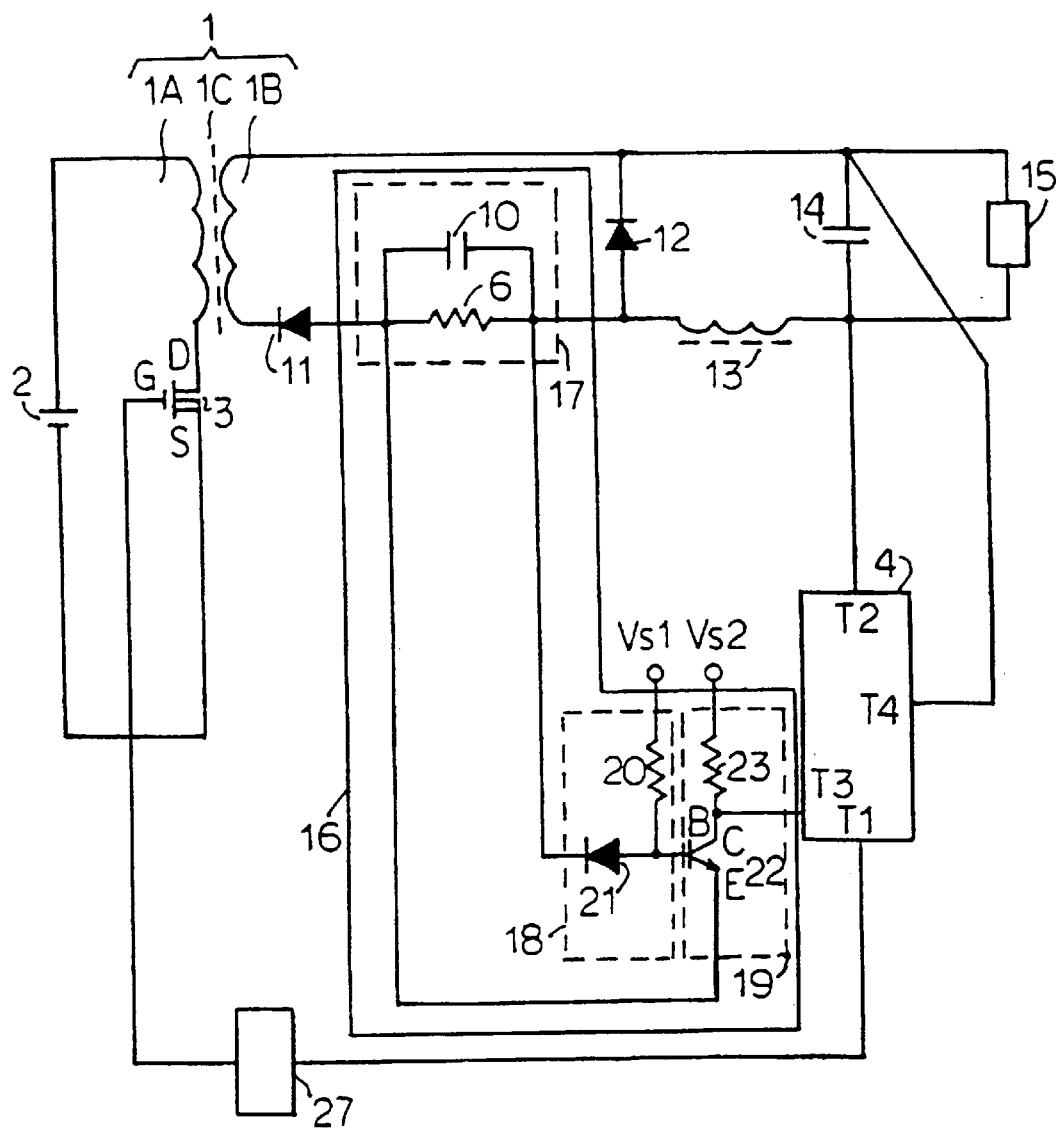
FIG. 4 is a circuit diagram of a switching power supply in which the overcurrent protection circuit according to the present invention is provided for the output circuit.
Figure 5A:
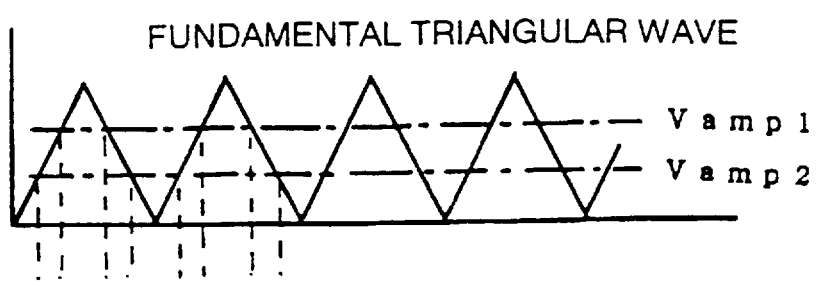
FIG. 5A shows a waveform of a triangular wave generated in a PWM IC.
Figure 5B:
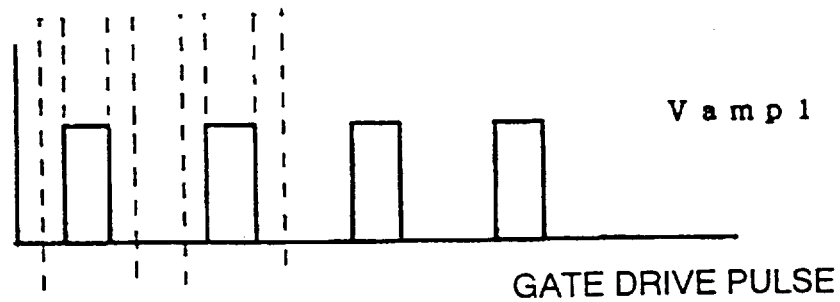
FIGS. 5B and 5C respectively shows waveforms output from the PWM IC as a drive pulse in the case where the amplified output voltage $V_{amp1}$ and $V_{amp2}$ are input.
Figure 5C:
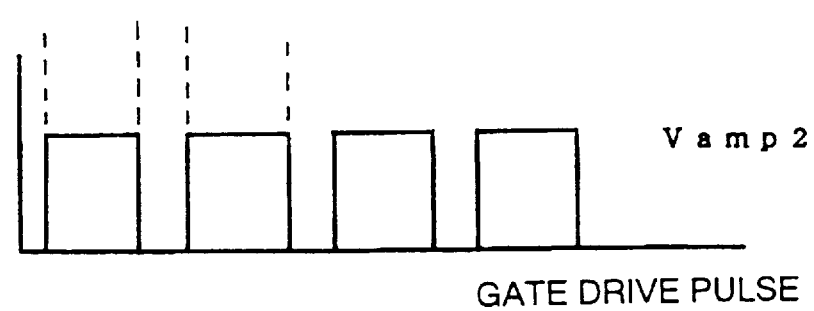

The current detecting means 17 may be connected to both ends of the rectifying diode 11, instead of being connected between the source S of the MOSFET 3 and the negative voltage side of the DC power supply 2, so that a circuit current flowing through the output circuit of the switching power supply is detected. FIG. 4 shows a case in which the current detecting means 17 is connected between the anode of the rectifying diode 11 and the anode of the flywheel diode 12. In this case, to provide electrical isolation between the input circuit and the output circuit of the switching power supply, a driving pulse output from the gate drive terminal T1 of the PWM IC 4 is supplied through a driving transformer or optical coupling 27 to the gate G of the FET 3. Instead of a driving transformer, an optocoupler may be used, which employs optical coupling. The circuit operation in this circuit configuration is the same as that in the case of FIG. 1 in which the current detecting means 17 is connected between the source S of the MOSFET 3 and the negative voltage side of the DC power supply 2, and the description thereof will be omitted.

The case has been described in which the above-described overcurrent protection circuit is provided for the isolating-type switching power supply. The circuit can be used in the same way even with a non-isolating-type switching power supply having a switch device which is ON/OFF-controlled by the use of a PWM IC.

As is explained in detail, since an overcurrent protection circuit according to the present invention is configured as described above, the overcurrent protection circuit is formed with a simple circuit configuration without using an expensive comparator having a quick response. Therefore, a switching power supply provided with the overcurrent protection circuit can be manufactured at low cost.

Even in a switching power supply using a switch device which operates at a relatively high switching frequency, since a good response to an overcurrent is provided, the output current decreases substantially immediately, not gradually, in the relationship between the output current and the output voltage even when an overcurrent flows. As a result, pulse-by-pulse control can be performed which maintains a normal state by detecting a circuit current generated in each switching period of the switch device, and heat generated in electronic components constituting the input circuit and the output circuit can be suppressed to a low level.

Therefore, a temperature increase in an electronic circuit in which the switching power supply is built is suppressed, and thereby malfunction of the electronic circuit caused by a temperature increase is reduced.

With the voltage obtained by superposing the forward-direction voltage drop of the diode in the voltage superposition means onto the voltage detected by the current detecting means, the means for narrowing the driving-pulse width is operated. Therefore, the impedance of the current detecting means used for an overcurrent protection circuit of the present invention can be set to a lower value than in the conventional case, and a continuity loss produced while the switching power supply is operating in a steady state can be suppressed to a low level.

In addition, since the circuit is formed such that the temperature drift of the ON voltage of the npn transistor and the temperature drift of the forward-direction voltage drop of the diode are canceled, the temperature drifts are suppressed. Therefore, the difference at room temperature between the maximum rated current and an overcurrent can be set to a low value, and heat generated in electronic components constituting the input circuit and the output circuit of the switching power supply can be suppressed.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An overcurrent protection circuit for a switching power supply including a switch device; a PWM control circuit for generating a driving pulse for pulse-width-modulation control of the switch device, the PWM control circuit provided with a setting terminal at which a duty cycle of the driving pulse is set to a small value by changing an applied voltage; and an output rectifying diode for rectifying an AC voltage generated by ON-OFF control of the switch device, the overcurrent protection circuit comprising:

current detecting means for detecting a circuit current flowing through at least one of the switch device and the output rectifying diode and for producing a detected voltage;

voltage superposition means coupled to a first voltage source at one end, for superposing a constant voltage onto the detected voltage detected by the current detecting means; and means for reducing the width of the driving pulse for the switch device, the reducing means including a transistor which is ON-controlled by a voltage obtained by superposing the constant voltage onto the detected voltage detected by the current detecting means when an overcurrent flows, and a resistor connected between an output of the transistor and a second voltage source, wherein a voltage applied to the setting terminal of the PWM control circuit is reduced due to the voltage drop at the resistor when the transistor is turned on.

2. The overcurrent protection circuit of claim 1, wherein the voltage superposition means includes a diode, and a forward-direction voltage drop of the diode is superposed as the constant voltage onto the detected voltage detected by the current detecting means.

3. The overcurrent protection circuit of claim 1, wherein the current detecting means comprises a current detecting resistor.

4. The overcurrent protection circuit of claim 1, wherein the current detecting means comprises a current transformer and a resistor connected across a secondary coil of the current transformer.

5. The overcurrent protection circuit of claim 1, wherein the first voltage source, connected to one end of the voltage superposition means, comprises a DC power supply.

6. The overcurrent protection circuit of claim 1, wherein the first voltage source, connected to one end of the voltage superposition means, comprises a pulse power supply synchronized with an ON signal for the switch device.

7. The overcurrent protection circuit of claim 1, wherein the current detecting means comprises a current detecting element in series with the output rectifying diode.

8. The overcurrent protection circuit of claim 7, wherein the current detecting element comprises a resistor.

9. An overcurrent protection circuit for a switching power supply including a switch device; a PWM control circuit for generating a driving pulse for pulse-width-modulation control of the switch device, the PWM control circuit provided with a setting terminal at which a duty cycle of the driving pulse is changed by changing an applied voltage; and an output rectifying diode for rectifying an AC voltage generated by ON-OFF control of the switch device, the overcurrent protection circuit comprising:

a current detector for detecting a circuit current flowing through at least one of the switch device and the output rectifying diode and for producing a detected voltage;

a voltage superposition circuit coupled to a first voltage source at one end, for superposing a constant voltage onto the detected voltage detected by the current detector; and a circuit for changing the width of the driving pulse for the switch device, the width changing circuit including a controlled switch which is ON-controlled by a voltage obtained by superposing the constant voltage onto the detected voltage detected by the current detector when an overcurrent flows, and a resistor connected between an output of the controlled switch and a second voltage source, wherein a voltage applied to the setting terminal of the PWM control circuit is changed due to the voltage drop at the resistor when the controlled switch is turned on.

10. The overcurrent protection circuit of claim 9, wherein the voltage superposition circuit includes a diode, and a forward-direction voltage drop of the diode is superposed as the constant voltage onto the detected voltage detected by the current detector.

11. The overcurrent protection circuit of claim 9, wherein the current detector comprise a current detecting resistor.

12. The overcurrent protection circuit of claim 9, wherein the current detector comprises a current transformer and a resistor connected across a secondary coil of the current transformer.

13. The overcurrent protection circuit of claim 9, wherein the first voltage source, connected to one end of the voltage superposition circuit comprises a DC power supply.

14. The overcurrent protection circuit of claim 9, wherein the first voltage source, connected to one end of the voltage superposition circuit comprises a pulse power supply synchronized with an ON signal for the controlled switch device.

15. The overcurrent protection circuit of claim 9, wherein the current detector comprises a current detecting element in series with the output rectifying diode.

16. The overcurrent protection circuit of claim 15, wherein the current detecting element comprises a resistor.

17. The overcurrent protection circuit of claim 9, wherein the width changing circuit reduces the width of the driving pulse for the controlled switch device by reducing the voltage applied to the setting terminal of the PWM control circuit.

* * * * *